United States Patent [19]

Walker et al.

[11] 4,262,644

[45] Apr. 21, 1981

[54] SPARK TIMING CONTROL CIRCUIT FOR CONTROLLING THE TIMING OF SPARK IGNITION OF AN INTERNAL COMBUSTION ENGINE

[75] Inventors: David M. Walker, Freuchie; Alastair K. Stevenson, Glenrothes, both of Scotland

[73] Assignee: Hughes Microelectronics, Ltd., Fife, Scotland

[21] Appl. No.: 63,656

[22] Filed: Aug. 3, 1979

[30] Foreign Application Priority Data

Oct. 27, 1978 [GB] United Kingdom ............... 42237/78
Jan. 3, 1979 [GB] United Kingdom ................... 138/79

[51] Int. Cl.³ ............................................. F02P 5/06
[52] U.S. Cl. .................................... 123/418; 123/416
[58] Field of Search .............. 123/117 D, 418, 117 R, 123/805; 364/807, 426, 431, 108

[56] References Cited

U.S. PATENT DOCUMENTS

| | | | |
|---|---|---|---|
| 3,752,139 | 8/1973 | Aeplund | 123/117 D |
| 3,898,894 | 8/1975 | Aono et al. | 123/117 D |
| 3,904,856 | 9/1975 | Monpetit | 123/117 D |
| 3,923,021 | 12/1975 | Stark | 123/117 R |
| 3,941,103 | 3/1976 | Hartig | 123/117 R |
| 4,009,699 | 3/1977 | Hetzler et al. | 123/117 D |
| 4,020,807 | 5/1977 | Del Zotto et al. | 123/117 R |
| 4,104,997 | 8/1978 | Padgitt | 123/117 R |

*Primary Examiner*—Charles J. Myhre
*Assistant Examiner*—R. A. Nelli
*Attorney, Agent, or Firm*—John Holtrichter, Jr.; William H. MacAllister

[57] ABSTRACT

A spark timing control circuit for an internal combustion engine, includes a speed band selector circuit which responds to an electrical signal indicative of engine speed and provides an output signal indicative of which of a plurality of speed bands is occupied by the engine speed. Spark timing information for each speed band is stored in a memory as a first word in units of angular rotation of the engine for the heaviest engine operating load, and a second and third words indicative of the slope of straight line approximations to the curve of engine load plotted against advance in said angle units. A build up circuit responds to an electrical signal indicative of the engine operating load and computes from the second and third words a build up word which is added to the first word in an accumulator so as to derive an accumulated word in said angle units indicative of the desired spark timing. A residue angle counter, clocked by angle clock pulses from a clock converts the accumulated word into a corresponding time delay which is used to control the timing of the occurrence of spark ignition.

11 Claims, 5 Drawing Figures

SPARK TIMING CONTROL CIRCUIT FOR CONTROLLING THE TIMING OF SPARK IGNITION OF AN INTERNAL COMBUSTION ENGINE

FIELD OF THE INVENTION

This invention relates to a spark timing control circuit for controlling the timing of spark ignition of an internal combustion engine in response to electrical signals indicative of engine speed and engine load.

BACKGROUND OF THE INVENTION

In British Patent Specification No. 1,481,683 (which is assigned to the assignee of the present application) an ignition system for an internal combustion engine is described in which the timing of spark ignition is controlled by an electrical circuit that includes a memory programmed with information about the desired spark timing as a function of engine speed and engine load. The information in the memory is addressed with signals indicative of engine speed and load in order to derive from the memory an output word indicative of the desired spark timing. This arrangement permits a more accurate control of spark timing than has hitherto been possible with mechanical spark timing control arrangements, and consequently aids in allowing factors such as fuel economy, pollutant emission and performance to be optimised for the engine. The optimum spark timing is a complex non-linear function of speed and the load and in order to store this function in the memory it has previously been proposed that for each value of engine speed there should be stored a group of timing values for different values of engine load. It will therefore be appreciated that a large capacity memory with complicated addressing circuitry is required so as to store an adequate number of timing values over the operating ranges of engine speed and load, in order to provide adequate accuracy and resolution in the timing values produced by addressing the memory, to warrant use of the circuit rather than the conventional mechanical arrangement.

SUMMARY OF THE INVENTION

It is an object of the invention to reduce the storage capacity of the memory required to store information about the optimum spark timing as a function of engine speed and load to the aforesaid accuracy.

The present invention makes use of our discovery that if for a particular engine speed, the desired spark timing is plotted on a graph in units of angular rotation of the engine against engine load, the resulting plotted function has a far less complex shape than if the timing is plotted in units of time, and that the plotted function in said angle units can be adequately approximated to the aforesaid accuracy by a small number (for example one or two) straight lines. Thus, as will become more apparent hereinafter, for each engine speed there need only be stored information about the timing in said angle units for a predetermined load, and information about the slope of the straight line(s) which approximate the plotted function, thereby permitting a substantial reduction of the stored data as compared with the prior proposal aforesaid.

The present invention makes use of this discovery to provide an improved spark timing control circuit having a memory for controlling the timing of spark ignition of an internal combustion engine in response to electrical signals indicative of engine speed and engine load in which the memory capacity is reduced. The circuit of the invention has a speed band selector circuit responsive to a signal indicative of engine speed and adapted to provide an output signal indicative of which a plurality of predetermined speed bands is occupied by the value of engine speed indicated by said speed signal. The memory of the circuit is programmed with information about the desired occurrence of the ignition spark for the speed bands respectively, the information for each speed band consisting of a first stored signal indicative of the desired occurrence of a spark measured in units of angular rotation of the engine from a predetermined rotational position thereof and for a predetermined engine load, and a second stored signal in said angle units and indicative of an incremental angular change to be made to the angle defined by the first stored signal for an incremental change in engine load. The memory is responsive to the output signal from the speed band selector circuit so as to provide addressed ones of the first and second stored signals for the speed band indicated by the output signal. A build up means responsive to a signal indicative of engine load, is adapted to add the addressed second stored signal to the addressed first stored signal a number of times determined by the number of said increments of engine load by which the value of engine load indicated by said load signal differs from said predetermined load, so as to produce an accumulated signal indicative of the desired angle of occurrence of the spark as a function of engine speed and load. Also provided as a means for converting the angle represented by the accumulated signal into a time delay signal for controlling generation of a spark, the delay signal being indicative of a delay relative to a predetermined time in the engine operating cycle and which is a function of the time taken for the engine to rotate at the engine speed indicated by said engine speed signal through the angle represented by said accumulated signal.

The circuit of the invention has the advantage that the storage capacity of the memory can be reduced substantially without degrading the accuracy of the ignition timing produced by the circuit, thereby permitting the circuit to be conveniently produced by integrated circuit techniques with high yields and at relatively low cost.

In order that this advantage and other features and advantages of the invention may be more fully understood and readily carried into effect, a preferred embodiment thereof will now be described by way of illustrative example with reference to the accompanying drawings.

DESCRIPTION OF PREFERRED EMBODIMENT

Figure 1:
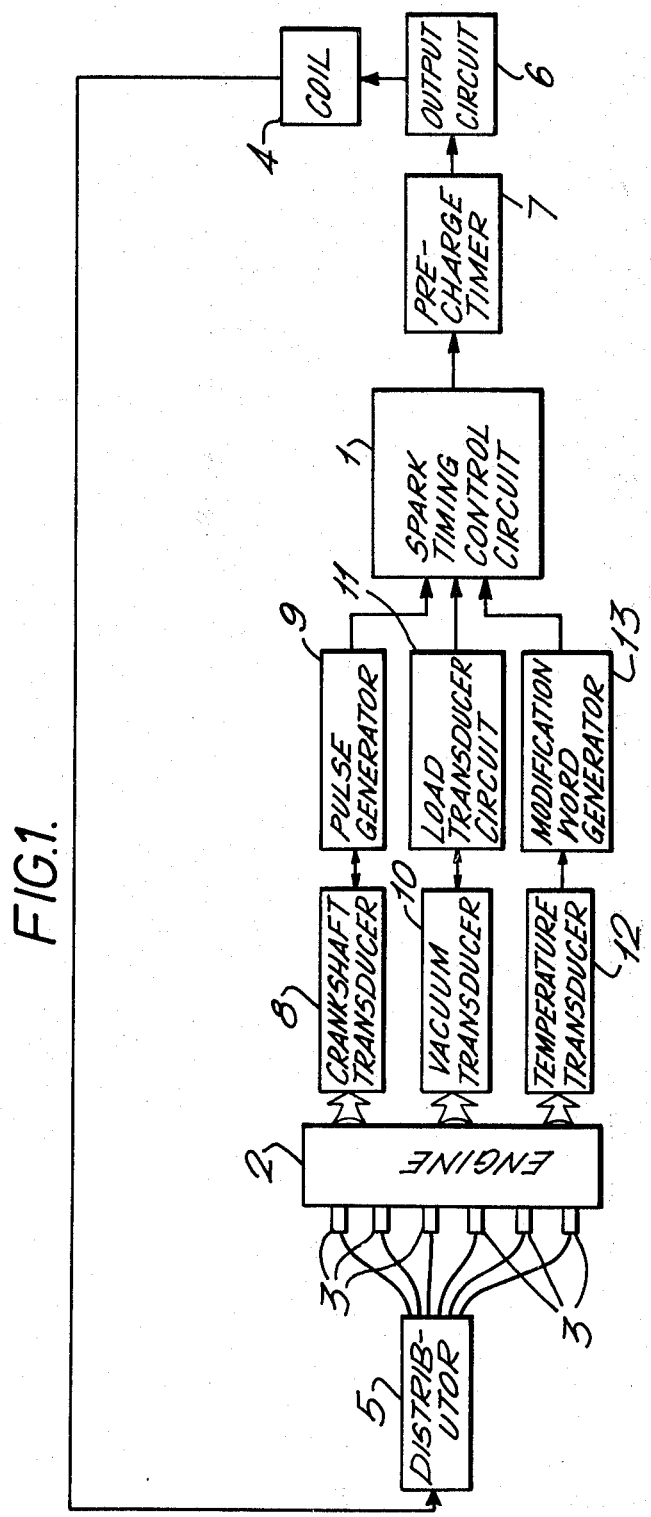
FIG. 1 is a schematic block diagram of an ignition control circuit in accordance with the present invention, installed on an internal combustion engine.

Referring to FIG. 1, there is shown a spark ignition control circuit 1 installed on a six cylinder four stroke internal combustion engine 2. The engine is provided with spark plugs 3 which are fed with high voltage electrical pulses produced by an ignition coil 4. The pulses from the coil 4 are distributed by means of a distributor 5 to the spark plugs 3 in the desired order of firing of the engine cylinders. The distributor 5 can be of the conventional mechanical type or preferably consists of a reed relay switch arrangement.

The coil 4 typically is of the conventional type having a low voltage primary winding and a high voltage secondary winding (neither shown) connected to the distributor 5. The low voltage primary winding receives a succession of low voltage pulses from an output circuit 6, and at the termination of each pulse a high voltage pulse is induced in the secondary winding of the coil 4, as is well known in the art. The output circuit 6 typically includes a conventional switching transistor (not shown) which gates a d.c. supply to the primary winding of the coil 4. The duration for which the d.c. supply is gated by the transistor to the primary winding is controlled by a pre-charge timer 7. The pre-charge timer is arranged to render the transistor conductive for a period which is independent of engine speed within a particular range of engine speed. The advantages of such an arrangement are described in more detail in our British Patent Specification No. 1,481,683, the main advantage being that the resulting constant conduction period of the transistor ensures high energy sparks at high engine speeds which has been hitherto difficult to achieve with conventional mechanical contact breaker arrangements.

The system to be described operates with a constant pre-charge period for all operating engine speeds so that for each ignition spark, the transistor in the output circuit 6 is switched on for a constant period irrespective of engine speed. However, if desired the period of the pre-charge timer can be altered selectively for different engine speed ranges, as will become apparent from the later description.

The frequency and timing of the operation of the pre-charge timer 7 is controlled by the control circuit 1 in response to inputs from the engine 2 indicative of its rotational speed, load and optionally other parameters such as temperature.

The rotational speed of the engine is monitored by a transducer 8 which conveniently comprises the arrangement described in our British Patent Application No. 12330/78 from which it will be appreciated that the transducer 8 consists of a disc mounted to rotate with the engine crankshaft the disc having a castellated periphery of which the radially extending edges define predetermined angular positions just prior to top dead centre (TDC) for the six cylinders respectively. A coil arrangement is mounted on the engine block and is arranged to detect the passage of the edges of the disc's castellations. Electrical circuitry connected to the coils provides a rectangular output waveform the frequency of which is indicative of engine speed and in which the leading and trailing edges are accurately indicative by their phase of the occurrence of TDC for the six cylinders. The rectangular waveform produced by the transducer 8 is fed to a pulse generator 9 which produces a train of pulses T indicative of TDC for the successive cylinders in the engine cycle. The pulse train T is fed to the control circuit 1.

The engine load is measured by sensing the level of partial vacuum obtained in the inlet manifold by means of a vacuum transducer 10 consisting of a flexible diaphragm connected to a movable vane which includes apertures movable to obturate in dependence upon the position of the diaphragm the relative coupling between coils disposed on opposite sides of the vane. This arrangement is described in detail in British Patent Application No. 19737/77 but is only shown schematically in FIG. 1 of this application. The vacuum transducer 10 is driven by a load transducer circuit 11 which responds to the relative coupling between the coils of the transducer 10 and produces a digital word indicative of the engine load, the word being fed to the control circuit 1. Circuitry suitable for the load transducer circuit 11 is described in more detail in the Complete Specification filed on our cognated British Patent Application Nos. 11725/76; 17856/75; 47754/76. The digital load word has a value of zero for maximum load and increases in value for decreasing engine load.

Other engine operating parameters such as temperature, etc. can be sensed and processed to produce digital words indicative thereof as described in our last-mentioned copending application, an arrangement for producing a modification word indicative of engine temperature being shown schematically in the present FIG. 1 at 12 and 13.

Figure 2:
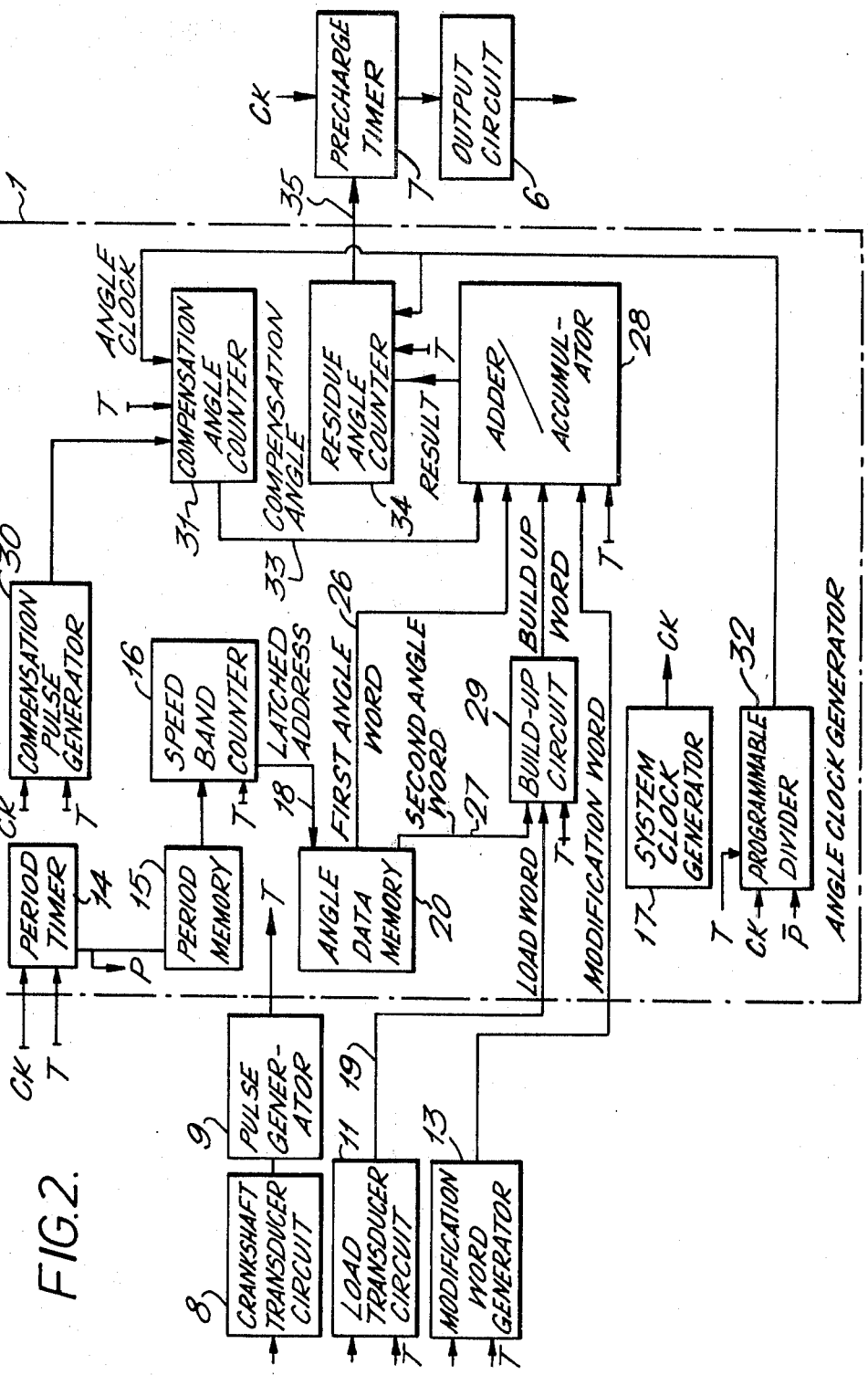
FIG. 2 is a block diagram illustrating the ignition control circuit in more detail.
Figure 3:
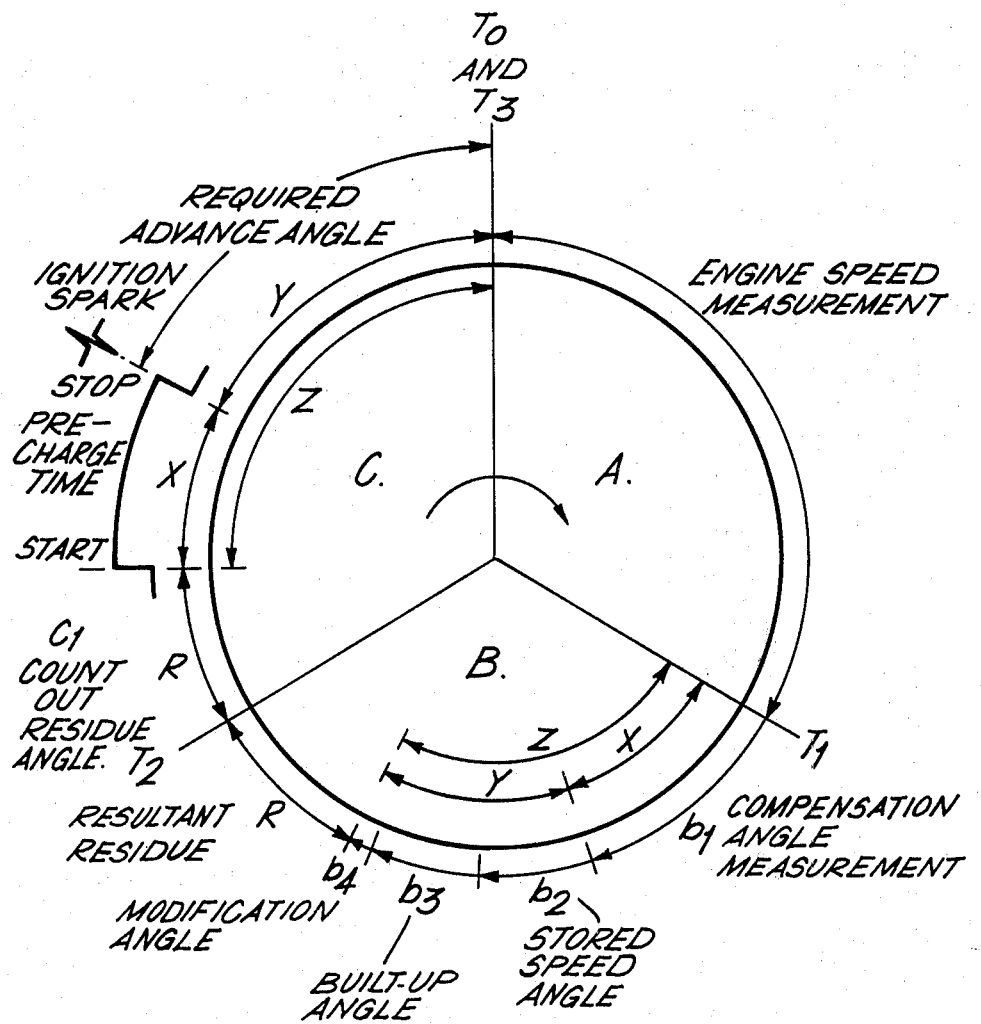
FIG. 3 is a timing diagram illustrating the timing sequence effected in operation of the ignition control circuit.

The way in which the control circuit 1 computes the desired ignition advance in response to the sensed engine load and speed and other optional engine parameters will now be described in detail with particular reference to FIGS. 2 and 3. FIG. 2 shows the circuit 1 in a more detailed block diagrammatic form within the hatched outline in the Figure, whereas FIG. 3 is a timing diagram illustrating the occurrence of various signals produced in operation of the circuit 1 in terms of the angular rotational position of the engine's crankshaft. Now, for a six cylinder engine, one of the pistons will reach TDC every successive 120° of crankshaft rotation, so that for one revolution of the crankshaft, the pulse train produced by the pulse generator circuit 9 consists of successive pulses $T_0$, $T_1$, $T_2$, $T_3$ as shown in FIG. 3. Thus each crankshaft revolution can be considered to consist of three successive engine periods A, B and C in each of which an ignition spark is to be produced. The control circuit 1 produces timing information for each spark in dependence upon computations performed in the two engine periods preceding the spark. Thus, for example the timing of the spark produced in engine period C is determined by the result of computations performed during periods A and B and this particular sequence will be considered in detail in order to explain the operation of the circuit 1.

During the period A, the circuit 1 computes the engine speed from the periodicity of the pulse train T, and also establishes a digital word indicative of engine load. During the period B, the speed and load information is used in a computation which determines from preprogrammed information a desired timing of the spark in terms of units of angular rotation of the crankshaft. During the period C, the computed angular position of the spark is converted into an appropriate time delay for the engine speed concerned, which is used to control the time at which the pre-charge timer 7 is brought into operation to initiate the spark.

Referring now to FIG. 2, the engine speed is computed by the circuit 1 from the periodicity of the waveform T. The possible speed range of the engine is divided into a contiguous set of speed bands and the circuit produces a digital word indicative of the speed band in which the engine speed lies. This computation is effected during the period A by a period timer 14, a period memory 15 and a speed band counter 16. The period timer 14 is a counter arranged to count constant frequency clock pulses CK from a system clock 17, the timer 14 being reset by successive pulses T. Thus the count accumulated in the timer 14 between successive pulses T is indicative of the periodicity of the engine's crankshaft rotation. The count as it accumulates in the timer 14 is fed to the period memory 15 which consists of a programmable divider arranged to produce an output pulse each time the accumulating count from the timer 14 exceeds a pre-programmed value. The pre-programmed values of the memory 15 effectively define the widths of the aforementioned speed bands although the bands are stored in the memory 15 in units of engine periodicity. The output pulses from the memory 15 are counted between successive pulses T by the counter 16. The counter 16 produces an output indicative of its count and is reset in response to each pulse T. Now, the pulses from the memory 15 counted by the counter 16 are indicative of the engine having a periodicity within a particular range. As is well known, rotational speed is inversely proportional to periodicity and so in order to convert the output of the memory from units of periodicity into units of speed, the counter 16 is arranged to count downwardly so that the occurrence of each successive pulse from the memory 15 results in the counter 16 counting downwardly from the uppermost speed band towards the lowermost band, such that at the end of the period A, the count in the counter 16 is a digital word indicative of the engine speed band in which the engine speed lies. The relative size and number of the speed bands is selected for the circuit by an appropriate mask selection for the period memory 15. Typically 40 speed bands are provided encompassing engine speeds between 0 and 10,000 r.p.m.

Referring again to the timing diagram of FIG. 3, on the occurrence of the pulse $T_0$, the timer 14 will be cleared and during the period A will count clock pulses from the clock 17, and the counter 16 will count down through the speed bands as the count accumulates in the timer 14. At the end of the period A, which is marked by the occurrence of the pulse $T_1$, the counter 16 outputs its count on line 18 to provide a digital word indicative of the speed band occupied by the engine speed. Also, the occurrence of the pulse $T_1$ causes the load transducer circuit 11 to output on line 19 a digital word indicative of the current engine load. The load and speed band words are used during period B to address and process pre-programmed data about the desired advance for the spark to be initiated in period C.

Figure 4:
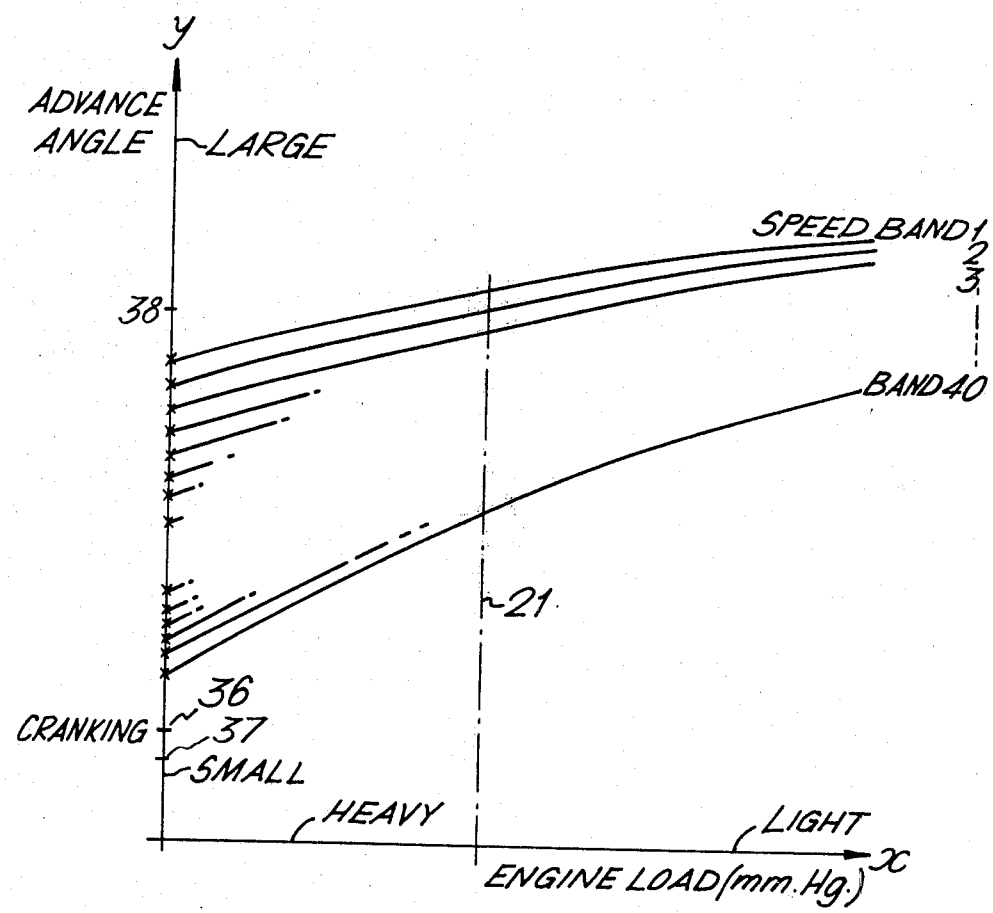
FIG. 4 illustrates a family of curves for different engine speeds, of spark ignition advance in units of angular rotation of the engine's crankshaft plotted against engine load.

The pre-programmed data is held in a read only memory (ROM) 20 and consists of data concerning a map of the desired advance angle prior to TDC for the spark. The data consists of information about a family of curves of the desired advance angle as a function of engine load, there being information about a separate curve for each speed band. It is to be noted that the spark advance information is stored in units of angular rotation of the crankshaft prior to TDC rather than in units of time. This has the advantage that the advance/load curve for each speed band over the operating range of engine load can be represented accurately by a straight line or two abutting straight line segments. A family of advance angle/load curves for the various speed bands of a typical engine are shown in FIG. 4. These curves each can be approximated with some accuracy by a first straight line extending from the y axis to the hatched "breakpoint" line 21 and by a second straight line extending from the breakpoint line to zero load. Some of the curves can be represented by a single straight line. In contrast, if the curves are plotted with the spark advance shown in units of time, the curves are much less linear, are closely crushed together in the region of low engine load and cannot be accurately represented by a small number of straight lines.

We have appreciated that by storing the curves in terms of angle units and by making the straight line approximation mentioned with reference to FIG. 4, the storage capacity of the read only memory 20 can be reduced substantially since only three words need to be stored to define the load/advance curve for each speed band (assuming a predetermined breakpoint line 21). These three words are representative of the angular advance required at a predetermined load (in this example the heaviest operating load), and the slope of the curve's straight line approximations on either side of the predetermined breakpoint 21 respectively. One of the load/advance angle curves for a typical speed band is shown in detail in FIG. 5. The curve 22 is approximated by straight lines 23 and 24 of different slopes. The data stored in the ROM 20 concerning the curve consists of a first word indicative of the advance angle at 25 for the heaviest operating load, and second and third words indicative of the slopes of the lines 23 and 24. The second and third words are stored as a fractional advance angle per unit of load. Groups of three such words are stored in the ROM 20 for each speed band.

Referring again to FIG. 2, data from the speed band counter 1b is derived during the period B of FIG. 3. The word on line 18 indicative of the speed band is used as an address to the ROM and the stored three words for the addressed speed band are produced on ROM output lines 26 and 27, the first stored word indicative of the advance angle at 25 being fed on the line 26 directly to an accumulator 28, and the other two stored words indicative of the slopes of lines 23 and 24 are fed to a build-up circuit 29. The build-up circuit 29 also receives the load word on line 19. The circuit 29 operates to pass repetitively to the accumulator 28 the fractional advance angle defined by the second stored word from the ROM 20, (indicative of the slope of line 23 in FIG. 5) by a number of times equal to the value of the load word. If the value of the load word is sufficiently large to exceed the load value at the breakpoint 21, the fractional advance defined by the third stored word (indicative of the slope of line 24 in FIG. 5) is repetitively passed to the accumulator 28 for the remainder of the units of the load word 19 which exceed the breakpoint 21.

Figure 5:
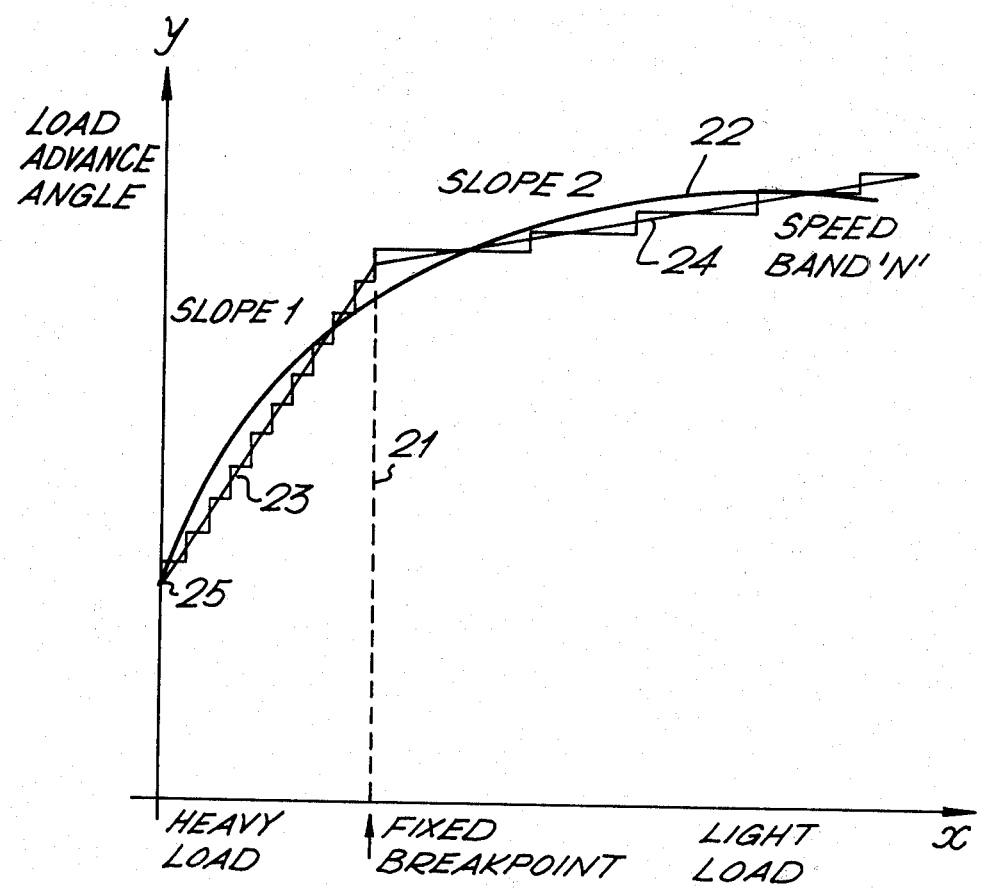
FIG. 5 illustrates one of the curves of FIG. 4 in more detail and a method of approximating the slope of the curve by two straight lines.

The accumulator 28 is effective to add the sequence of fractional angle advances produced by the build-up circuit 29 to the first stored word from the ROM 20, and thus, referring to FIG. 5, the effect is to first load into the accumulator 28 a word indicative of the advance angle at 25 and then to move along the staircase waveform shown in FIG. 5 (to a position determined by the engine load) so as to accumulate in the accumulator 28 a word indicative of the desired advance angle as dictated by engine speed and engine load.

The angles produced by the first stored word produced on line 26 and the sum of the fractional angle advances produced by the build-up circuit 29 are shown at $b_2$ and $b_3$ respectively in FIG. 3. The build-up circuit 29 is reset by the pulse waveform T so that the build-up process is repeated for each engine period.

The word accumulated in the accumulator 28 can be modified by adding to, or subtracting from it a modification word produced by the modification word generator 13. In this example, the modification word is produced in response to an engine temperature sensor 12 but other parameters could be used if desired and for example the modification word could be a function of air pressure, altitude or air flow rate to the engine.

Also, the modification word generator 13 could be made responsive to an acoustic detonation detector so as to reduce the ignition advance automatically if detonation occurs. Such an arrangement is desirable with high performance racing engines which are operated at an advance angle appropriate to obtain maximum engine power but which is close to a value which produces detonation. The advance angle produced by the modification word is shown at $b_4$ in FIG. 3.

Thus, from FIG. 3, it will be seen that there is established in the accumulator 28, during the period B, a word indicative of the angular advance $Y = b_2 + b_3 + b_4$. This angle Y is equal to the desired advance angle for the spark to be produced in the engine period C prior to the TDC position $T_3$. Now, as previously stated, the ignition spark is produced at the end of the constant pre-charge period defined by the pre-charge timer 7. Since the timing of the spark ignition can however only be controlled in terms of the time at which the pre-charge timer 7 is switched on, the circuit 1 needs to compute a pre-charge compensation angle X indicative of the constant pre-charge time, and add the angle X to the angle Y so as to provide an advance angle prior to $T_3$ at which switching on of the pre-charge timer will produce the desired advance Y for the spark.

It will be appreciated that the angle X occupied by the constant pre-charge time of the timer 7 will vary as a function of engine speed. Accordingly, the circuit 1 includes an arrangement to compute X in dependence upon engine speed. A digital word indicative of the angle X is produced by means of a compensation pulse generator 30, a compensation angle counter 31 and an angle clock generator 32.

The angle clock generator 32 is arranged to produce a constant number of pulses for each revolution of the crankshaft irrespective of its rotational speed. Thus, for example the clock will always produce 128 angle clock pulses for every 120° rotation of the crankshaft. The angle clock generator consists of a programmable divider which is programmed to divide the clock pulse train from the system clock 17 by a number $\bar{P}$ indicative of engine speed. The number $\bar{P}$ is updated upon the occurrence of every pulse T, the number $\bar{P}$ being the inverse of the output P of the period counter 14 at the occurrence of a T pulse. The output P is at such time indicative of the periodicity of the crankshaft revolutions and hence $\bar{P}$ at that time is indicative of engine speed.

The compensation pulse generator 30 is arranged to produce a constant duration pulse by counting a predetermined number of clock pulses from the system clock 17 following the occurrence of a T pulse which is used to reset the generator. The pulse generator 30 is used to simulate a constant time duration corresponding to that of the pre-charge timer 7. Thus, immediately following the pulse $T_1$ (FIG. 3), the generator 30 produces an output pulse for a predetermined constant time and this pulse is used to enable the compensation angle counter 31. The counter 31 is arranged to count angle clock pulses from the angle clock generator 32 during the enabling pulse from the generator 30. The counter 31 is reset by the T pulse waveform. Accordingly, after the pulse $T_1$, the counter 31 will accumulate a count of angle clock pulses indicative of the angle through which the crankshaft turns at its current speed during a constant time duration representative of the pre-charge period of the timer 7. Thus, at the end of the timing period of the generator 30, the count in the counter 31 is indicative of the angle X. The accumulated count is fed on line 33 to be added into the accumulator 28. The resulting sum in the accumulator is thus indicative of an angle Z where $Z = X + Y$.

As is shown in FIG. 2, the accumulator 28 is connected to a residue angle counter 34 which is clocked with pulses from the angle clock generator 32. The counter 34 has a capacity equal to an angle of 120° of crankshaft rotation. Both the accumulator 28 and the counter 34 are reset by the pulse waveform T.

Upon the occurrence of the pulse $T_2$ (FIG. 3), the word Z in the accumulator 28 is transferred into the residue counter 34 and then the remaining capacity of the residue counter starts to fill up with angle clock pulses from the angle clock generator 32. Thus, at the time $T_2$, the remaining empty capacity of the residue counter 34 is indicative of a residue angle R where $R = 120° - Z$. This angle is shown in FIG. 3 and is the angle between $T_2$ and the desired starting time of the pre-charge period, namely the desired delay in angle units from the pulse $T_2$ to the time at which the pre-charge timer 7 is to be actuated.

The residue counter 34 operates during the engine period C to convert the angle R into a corresponding time delay commencing from the pulse $T_2$. It will be appreciated that for a particular engine speed, the time delay which corresponds to the angle R is proportional to the product of the periodicity of the crankshaft rotation and the angle R. This multiple is computed by measuring the time taken for the remaining capacity of the counter 34 (equal to the angle R) to fill up with angle clock pulses (the periodicity of which is an integral fraction of the engine periodicity).

The counter 34 provides an overflow pulse when it becomes filled to capacity and the overflow pulse is fed on line 35 to initiate operation of the pre-charge timer 7. The pre-charge timer switches on the aforementioned switching transistor of the output circuit 6 for a constant time period which corresponds to the angle X for the engine speed concerned. At the end of pre-charge period, the transistor switches off, which generates an ignition spark with the required advance angle Y relative to the TDC position $T_3$ for the engine cylinder concerned.

Some modifications and additional features of the system will now be described.

The pre-charge period defined by the timer 7 has been described as being a constant period for all engine speeds. It is however possible to modify the system to define different pre-charge periods for different engine speed ranges. For example the total operating speed range of the engine could be divided into three ranges each associated with a different pre-charge period. The output from the speed band counter 16 could be used to select the appropriate pre-charge period. The pre-charge timer 7 typically comprises a counter arranged to count a programmed number of the system clock pulses from the clock 17, and in order to alter the pre-charge period, the number programmed into the timer 7 would be altered selectively. A commensurate alteration would be made to the number of clock pulses from clock 17 which are counted by the compensation pulse generator 30 in order to ensure that the output pulse produced by the generator 30 always simulates the appropriate pre-charge period in the advance angle computation.

The system can readily accommodate fixed angular and time delays in the circuitry which might otherwise degrade the accuracy of the spark timing. Fixed time delays in the circuitry can be compensated for by adjusting the duration of the pulse produced by the compensation pulse generator 30. Fixed angle delays can be compensated for by making an adjustment to the values of the speed advance angle words stored in the ROM 20, which are provided on line 26. Thus, for example the stored speed advance angle words can be modified in value to take account of the fact that the pulses T do not occur exactly at TDC but at a fixed angle prior to it.

It will be appreciated that instead of generating the compensation angle word X by means of the generator 30, counter 31 and angle clock 32, an appropriate value of the angle X for each of the speed bands could be subtracted from the desired angular advance information before it is stored in the ROM 20, so that the addressed information from the ROM automatically compensates for the angle X. Such an arrangement is not preferred however because it requires a substantial increase in the storage capacity of the ROM 20 in order to achieve the same accuracy in the value of X for all engine speeds. The number of stored speed bands in the ROM 20 would have to be increased substantially in order to obtain adequate resolution of the value of the angle X for different engine speeds.

At low engine speeds, very high rates of acceleration can occur, for instance during the time that the engine picks up from its cranking speed upon starting to its idling speed, or when the accelerator pedal is stamped on with the engine idling and out of gear. From the foregoing description, it will be appreciated that the angle clock generator 32 produces angle clock pulses at a rate determined by the engine speed in the preceding engine period i.e. the angle clock pulse rate in period C (FIG. 3) is determined by the engine speed in period B. Under such high rates of acceleration the angle clock rate becomes too slow and inaccurate and a situation can occur in which the residue counter 34 will not, when converting the angle R into a time delay from $T_2$, be filled by the angle clock pulses before the occurrence of pulse $T_3$ and accordingly will not provide an overflow pulse to initiate the pre-charge timer 7. To overcome this problem the circuit 1 can be provided with logic circuitry (not shown) which causes the pulse $T_3$ to initiate the pre-charge timer 7 in the event that the counter 34 does not provide its overflow pulse by the time $T_3$ occurs thereby ensuring that a spark is initiated for each engine period even though its timing is inaccurate during the extreme transitory acceleration.

Referring now to FIG. 4, the operation of the system when the engine is being started or cranked will now be described. During cranking the engine speed is close to zero r.p.m. and the speed band counter produces on line 18 (FIG. 2) a word which addresses a speed band for zero r.p.m. This speed band contains no build-up information to alter the advance as a function of load. Thus the ROM stores the value of the point 36 in FIG. 4 and provides an output word indicative thereof on line 26 during cranking. The advance angle value of the point 36 can take into account the known load conditions which occur at cranking speeds.

In order to reduce the storage capacity of the ROM, the speed advance words may be stored over a range of values from 37 to 38 as shown in FIG. 4 but which does not extend to a value of zero advance angle. The ROM can also store the value of the point 37 relative to zero advance and be arranged to add this value to the stored values of speed advance word in order to assemble the appropriate word to be fed out on line 26.

The system can be arranged to produce large advance angles at high engine speeds. Referring to FIG. 3, the pre-charge pulse is shown occurring in cycle C. Considering an unaltering advance angle but an increasing engine speed, the end of the pre-charge pulse will remain fixed at angle Y before the reference signal $T_3$.

However, with increasing engine speed, the start of the pre-charge pulse will occur sooner after the reference signal $T_2$ and angle R will become less.

It is a feature of the control circuit that if the system programming requirements are such that at very high advance angles and very high engine speeds, the pre-charge pulse requires to be started in period B for a spark occurring in period C, the control circuit provides this facility. It also ensures that a smooth transition of the pre-charge start signal from one period to the previous period and back again, is maintained.

The system can also be used to prevent engine overspeed conditions arising. Now, the power generated by an engine can be reduced by lessening the spark advance angle from optimum. This fact is used by the system to safely limit the maximum engine speed available. The amount of memory storage space is minimised by producing an automatic fall off in the advance angle as the engine speed increased above an optional predefined maximum speed.

The control circuit 1 described herein can be conveniently produced in integrated circuit form. The circuit 1 has the advantage that due to the manner in which the ROM 20 stores the ignition advance information, the storage capacity of the ROM can be reduced substantially which makes for a practical arrangement which can be manufactured relatively easily as an integrated circuit. If the spark information were stored as a plurality of points over a three dimensional load/advance time/speed map, the storage capacity required would be massive compared with that of the system described herein. Alternatively, if a minimum amount of information was stored, sufficient to allow calculation of the required advance angles, the system would require very complex computing facilities in order to process the stored data to derive the appropriate advance. Clearly, the present invention provides a much simpler and cheaper arrangement.

We claim:

1. A spark timing control circuit for controlling the timing of spark ignition of an internal combustion engine in response to electrical signals indicative of engine speed and engine load, comprising
   (a) a speed band selector circuit responsive to a signal indicative of engine speed and adapted to provide an output signal indicative of which of a plurality of predetermined speed bands is occupied by the value of engine speed indicated by said speed signal, (b) memory means programmed with information about the desired occurrence of the ignition spark for the speed bands respectively, the information for each speed band consisting of a first stored signal indicative of the desired occurrence of a spark measured in units of angular rotation of the engine from a predetermined rotational position thereof and for a predetermined engine load, and a second stored signal in said angle units and indicative of an incremental angular change to be made to the angle defined by the first stored signal for an incremental change in engine load, said memory means being responsive to the output signal from the speed band selector circuit so as to provide addressed ones of said first and second stored signals for the speed band indicated by the output signal, (c) build-up means responsive to a signal indicative of engine load and adapted to add the addressed second stored signal to the addressed first stored signal a number of times determined by the number of said increments of engine load by which the value of engine load indicated by said load signal differs from said predetermined load, whereby to produce an accumulated signal indicative of the desired angle of occurrence of the spark as a function of engine speed and load, and (d) means for converting the angle represented by the accumulated signal into a time delay signal for controlling generation of a spark, said delay signal being indicative of a delay relative to a predetermined time in the engine operating cycle and which is a function of the time taken for the engine to rotate at the engine speed indicated by said engine speed signal through the angle represented by said accumulated signal.

2. An internal combustion engine provided with a spark ignition system including
means for generating electrical signals indicative of engine speed and engine load; and
a spark timing control circuit comprising a speed band selector circuit responsive to a signal indicative of engine speed and adapted to provide an output signal indicative of which of a plurality of predetermined speed bands is occupied by the value of engine speed indicated by said speed signal, memory means programmed with information about the desired occurrence of the ignition spark for the speed bands respectively, the information for each speed band consisting of a first stored a signal indicative of the desired occurrence of a spark measured in units of angular rotation of the engine from a predetermined rotational position thereof and for a predetermined engine load, and a second stored signal in said angle units and indicative of an incremental angular change to be made to the angle defined by the first stored signal for an incremental change in engine load, said memory means being responsive to the output signal from the speed band selector circuit so as to provide addressed ones of said first and second stored signals for the speed band indicated by the output signal, build-up means responsive to a signal indicative of engine load and adapted to add the addressed second stored signal to the addressed first stored signal a number of times determined by the number of said increments of engine load by which the value of engine load indicated by said load signal differs from said predetermined load, whereby to produce an accumulated signal indicative of the desired angle of occurrence of the spark as a function of engine speed and load, and means for converting the angle represented by the accumulated signal into a time delay signal for controlling generation of a spark, said delay signal being indicative of a delay relative to a predetermined time in the engine operating cycle and which is a function of the time taken for the engine to rotate at the engine speed indicated by said engine speed signal through the angle represented by said accumulated signal.

3. An arrangement according to claim 2 wherein the information in said memory means for at least some of the speed bands includes a third stored signal indicative of the angular change to be made to the angle defined by said first stored signal for a difference between the predetermined load and a value of the load signal which exceeds a predetermined load difference, and wherein said build-up means is adapted to add the second stored signal to the first stored signal a number of times determined by said load difference when the value of the load difference is less than said predetermined value thereof, and for load differences exceeding said predetermined value thereof is adapted to add said second signal to the first signal by a number times determined by said predetermined load difference and to add said third signal to the accumulated signal thereby formed by a number of times determined by the difference between the load signal value and said predetermined load difference.

4. An arrangement according to claim 2 wherein the information in said memory means indicates the desired angular advance of the spark prior to a given occurrence in the operating cycle of the engine, and said angle converting means is arranged to compute said time delay from a preceding such given occurrence in the engine cycle.

5. An arrangement according to claim 4 wherein said occurrences are TDC for successive cylinders of the engine.

6. An arrangement according to claim 4 including a pre-charge generator adapted to generate at the end of the time delay defined by said time delay signal an electrical pulse of a duration substantially independent of engine speed at least within a predetermined range of engine speed, means adapted to add to said accumulated signal a compensation angle signal indicative of the angle in said angle units rotated by the engine at its operating speed during a period corresponding to the duration of the pulse from the pre-charge generator.

7. An arrangement according to claim 6 including a compensation pulse generator adapted to produce a compensation pulse of a duration corresponding to that produced by the pre-charge generator, an angle clock generator responsive to said speed signal such as to produce a predetermined number of angle clock pulses per cycle of the engine irrespective of engine speed, and a compensation angle counter adapted to count said angle clock pulses for the duration of said compensation pulse whereby to accumulate in the counter said compensation angle signal.

8. An arrangement according to claim 7 including an accumulator for accumulating said accumulated signal as a digital word.

9. An arrangement according to claim 8 including a modification word generator arranged to add a modification word to the accumulator.

10. An arrangement according to claim 8 wherein said angle converting means includes a residue angle counter having a count capacity which defines a predetermined angle of engine rotation in said angle units, means for loading the word accumulated in the accumulator into the residue angle counter, said residue angle counter being arranged to be clocked to a full condition with said angle clock pulses and being arranged to generate an overflow pulse upon becoming full, said precharge timer being arranged to initiate operation in response to said overflow pulse.

11. An arrangement according to claim 2 wherein said engine speed signal generating means is adapted to produce a train of pulses each of which occurs in a given relationship to TDC for successful cylinders of the engine, and wherein said speed band selector circuit includes a clock pulse generator, a period timer arranged to count pulses from the clock pulse generator between successive pulses in the speed signal, a programmable divider arranged to produce an output each time the count building up in the period timer exceeds a pre-programmed value, and a speed band counter arranged to count the outputs produced by the divider whereby to provide said output indicative of the occupied speed band.

* * * * *